United States Patent
Deng et al.

(10) Patent No.: US 8,704,405 B2
(45) Date of Patent: Apr. 22, 2014

(54) PARALLEL DEVICE INCLUDING A BATTERY MODULE AND CONTROL METHOD THEREOF

(75) Inventors: Linwang Deng, Shenzhen (CN); Yu Zeng, Shenzhen (CN); Yaming Deng, Shenzhen (CN)

(73) Assignee: BYD Company Limited (CN)

( * ) Notice: Subject to any disclaimer, the term of this patent is extended or adjusted under 35 U.S.C. 154(b) by 413 days.

(21) Appl. No.: 13/072,587

(22) Filed: Mar. 25, 2011

(65) Prior Publication Data

US 2011/0234006 A1 Sep. 29, 2011

(30) Foreign Application Priority Data

Mar. 29, 2010 (CN) .......................... 2010 1 0139260

(51) Int. Cl.
*H02J 1/00* (2006.01)
(52) U.S. Cl.
USPC .......................................................... 307/71
(58) Field of Classification Search
USPC ........ 320/121, 134–136, 231; 307/29, 36, 37, 307/39, 44, 48, 49, 113, 115, 130
See application file for complete search history.

(56) References Cited

U.S. PATENT DOCUMENTS 8,232,768 B2 * 7/2012 Hou et al. ...................... 320/121
2007/0188138 A1 * 8/2007 Kobayashi ..................... 320/119

FOREIGN PATENT DOCUMENTS

DE 19705192 A1 * 10/1997 ............... H02H 7/18

* cited by examiner

*Primary Examiner* — Rexford Barnie
*Assistant Examiner* — Daniel Kessie
(74) *Attorney, Agent, or Firm* — Alston & Bird LLP

(57) ABSTRACT

A parallel device comprises a battery module, a plurality of switching units and a control module being couplable to the battery module. The battery module includes a plurality of battery groups. The plurality of switching units includes a plurality of first switches. Each of the switching units is couplable to a respective battery group in series. Each series combination of the switching unit and the respective battery group is coupled in parallel with another series combination, and each of the switching unit includes a respective first switch coupled with a load in series. The control module is configured to receive values of measured voltages across at least two battery groups, calculate a voltage difference between the two received voltage values, compare an absolute value of the voltage difference to a reference voltage to obtain a voltage comparison result, and turn ON or OFF at least one of the first switches in accordance with the comparison result.

16 Claims, 4 Drawing Sheets

US 8,704,405 B2

PARALLEL DEVICE INCLUDING A BATTERY MODULE AND CONTROL METHOD THEREOF

CROSS-REFERENCE TO RELATED APPLICATION

This application claims foreign priority benefits under 35 U.S.C. §119 of Chinese Patent Application Serial No. 201010139260.9, filed on Mar. 29, 2010, the content of which is incorporated herein by reference in its entirety.

TECHNICAL FIELD

The present disclosure generally relates to a battery module, more particularly, to a parallel device including a battery module and control method thereof.

BACKGROUND

Batteries may be connected in series, parallel, or combination of both. Batteries connected in series have the positive terminal of one battery connected to the negative terminal of another battery. This configuration may increase the overall voltage but remain the same overall capacity. Batteries connected in parallel, on the other hand, have their like terminals connected together. In this configuration, the overall voltage remains the same but the overall capacity is increased.

When batteries are connected in parallel and configured to provide a high voltage, a current shock may be generated due to small internal resistance of batteries. If the value of the current shock is larger than required to meet the design criteria, it may cause severe side effect on batteries and other circuitry components. In worse situations, it may damage batteries and the entire circuitry.

BRIEF SUMMARY

Example embodiments of the present invention are directed to solve at least one of the problems existing in the prior art. Accordingly, a parallel device for the battery module and controlling method thereof are provided.

According to an aspect of the present invention, a parallel device comprises a battery module, a plurality of switching units and a control module being couplable to the battery module. The battery module includes a plurality of battery groups. The plurality of switching units includes a plurality of first switches. Each of the switching units is couplable to a respective battery group in series. Each series combination of the switching unit and the respective battery group is coupled in parallel with another series combination, and each of the switching unit includes a respective first switch coupled with a load in series. The control module is configured to receive values of measured voltages across at least two battery groups, calculate a voltage difference between the two received voltage values, compare an absolute value of the voltage difference to a reference voltage to obtain a voltage comparison result, and turn ON or OFF at least one of the first switches in accordance with the comparison result.

According to another aspect of the present invention, a method of controlling a parallel device comprises receiving values of measured voltages across at least two battery groups, calculating a voltage difference between the two received voltage values, comparing an absolute value of the voltage difference to a reference voltage to obtain a voltage comparison result, and turning ON or OFF at least one of the first switches in accordance with the voltage comparison result.

According to another aspect of the present invention, a control module being couplable to a battery module includes a plurality of battery groups. Each of the battery groups is couplable to a respective first switch, a second switch and a load. The control module is configured to receive values of measured voltages across at least two battery groups, calculate a voltage difference between the two received voltage values, compare absolute value of the voltage difference to a reference voltage to obtain a voltage comparison result, and turn ON or OFF at least one of the first switches in accordance with the comparison result.

BRIEF DESCRIPTION OF THE DRAWINGS

The foregoing summary, as well as the following detailed description of the invention, will be better understood when read in conjunction with the appended drawings. The embodiments illustrated in the figures of the accompanying drawings herein are by way of example and not by way of limitation. In the drawings.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
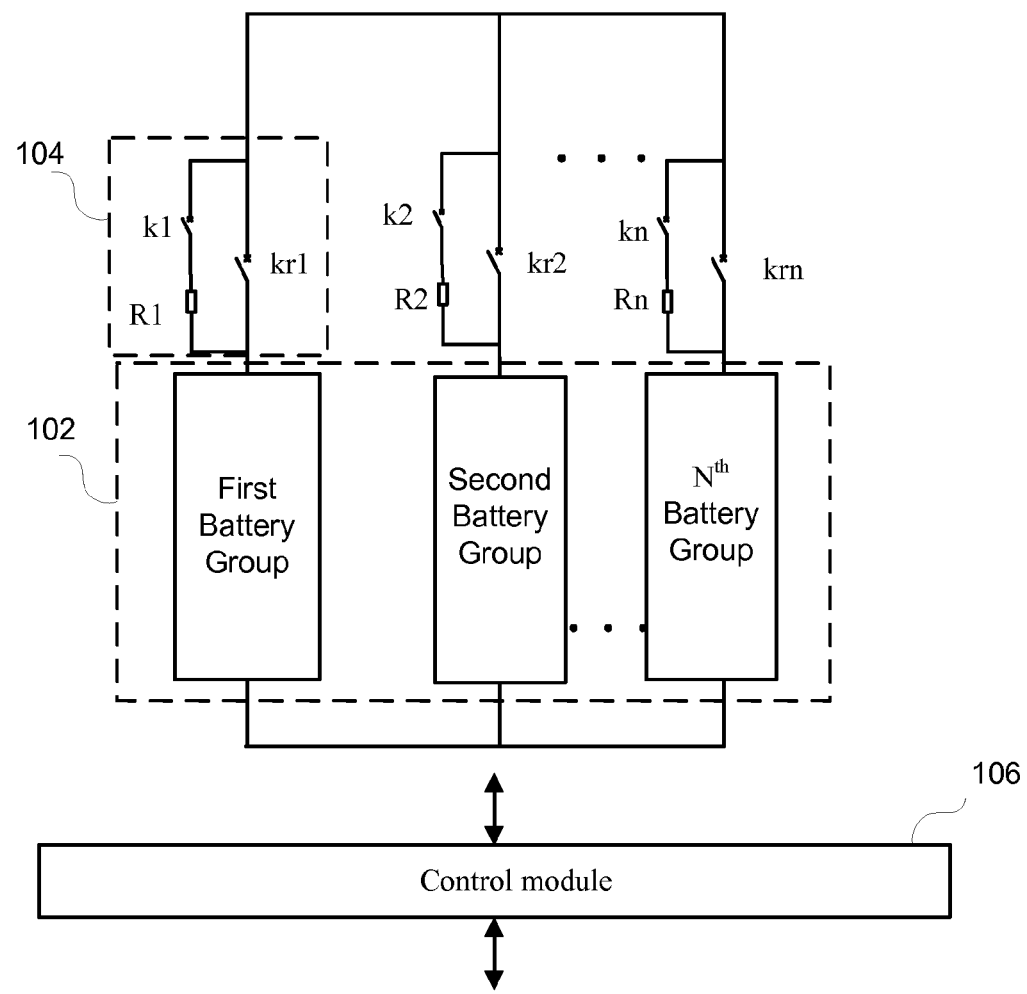
FIG. 1 illustrates a block diagram of a parallel device including a battery module according to one exemplary embodiment of the present invention.

FIG. 1 illustrates a block diagram of a parallel device including a battery module according to one exemplary embodiment of the present invention ("exemplary" as used herein referring to "serving as an example, instance or illustration"). As shown, a parallel device 100 includes a battery module 102, a plurality of switching units 104 and a control module 106. The battery module 102 is couplable to the control module 106. The battery module 102 includes a plurality of battery groups, such as a first battery group, a second battery group ... an $N^{th}$ battery group. Each of the switching units 104 is couplable to a respective battery group in series. Each series combination of a switching unit 104 and its respective battery group is coupled in parallel with another series combination of another switching unit 104 and its respective battery group. Each of the switching unit 104 may include a first switch coupled with a load in series, such as a first switch K1 coupled in series with a load R1 as shown in FIG. 1. Each of the switching units 104 may also include a second switch, such as a second switch Kr1 coupled in parallel with the series combination of the first switch K1 and the load R1.

The control module 106 may be configured to receive, for each battery group, a value of a measured voltage across the battery group (voltage value), and a value of a measured current through the battery group (current value). The control module 106 may also be configured to calculate a voltage difference between the two received voltage values measured across two battery groups over one measurement, and compare the absolute value of the voltage difference to a reference voltage $U_R$ to obtain a voltage comparison result. The voltage comparison result may be used to check if the voltage difference is safe or not for the entire circuitry. The control module 106 may therefore turn ON (i.e., close) or OFF (i.e., open) at least one of the first switches K1, K2 . . . Kn in accordance with the voltage comparison result. For example, if the result obtained by the check is positive, at least one of the first switch units K1, K2 . . . Kn is ON. Current shock and side effect on the battery groups may be avoided in this manner.

In one example embodiment, the reference voltage includes a first reference voltage $U_{R1}$ and a second, greater reference voltage $U_{R2}$ both of which are greater than or equal to zero, i.e., $0 \leq U_{R1} < U_{R2}$. Each switching unit includes a first switch coupled with a load in series. The loads R1, R2 . . . Rn may have similar or equivalent resistance R, which may be greater than 1Ω. The current $I_{max}$ represents the maximum current value the battery group may bear. In this example, the second reference voltage $U_{R2}$ may be predefined as less than or equal to multiplication of the maximum current value $I_{max}$ and the resistance R, i.e., $U_{R2} \leq I_{max}*2R$. In an instance in which the absolute value of the voltage difference U is less than the second reference voltage $U_{R2}$ and greater than or equal to zero, the first switches K1, K2 . . . Kn are turned ON. Otherwise, the absolute value of the voltage difference U between two battery groups is no less than the second reference voltage $U_{R2}$, the corresponding first switch, such as K1 are turned OFF and the corresponding second switch such as Kr1 are turned ON. In this situation, the battery group with the largest voltage value may be discharged, or the battery group with the smallest voltage value may be charged, until the absolute voltage value of the voltage difference between each two battery groups is within the range of zero to the second reference voltage $U_{R2}$. The current value in the circuitry may be accordingly controlled to be less than the maximum current value $I_{max}$ to avoid current shock. In an example embodiment, the first switches are turned OFF sequentially. The sequence for turning off the first switches K1, K2 . . . Kn may be predefined. An interval T between two OFF operations is about 0.3-0.4 seconds. In one example embodiment, the interval T is 0.35 seconds.

In operation, when the first switches K1, K2 . . . Kn are ON, and the voltage difference U in each battery group is less than the first reference voltage $U_{R1}$ and greater than or equal to zero, i.e., $0 \leq U < U_{R1}$, each of the second switches Kr1, Kr2 . . . Krn are ON. Otherwise, the first switches K1, K2 . . . Kn are OFF and the second switches Kr1, Kr2 . . . Krn are ON. In one example embodiment, the first reference voltage $U_{R1}$ is less than 0.5 V and greater than or equal to zero. In various applications, the ON operations of the second switch Kr1, Kr2 . . . Krn, and the OFF operations of the first switch K1, K2 . . . Kn can be performed alternatively or sequentially. When the voltage difference U meets the condition $0 \leq U < U_R$, turning ON the second switches Kr1, Kr2 . . . Krn subsequent to turning OFF the first switches K1, K2 . . . Kn may control the current value in each battery group under the maximum current value $I_{max}$. In this manner, the load such as R1 may consume little power which may save energy. In one example embodiment, the first reference voltage $U_{R1}$ is 0 V.

In one example embodiment, the control module 106 is configured to receive a value of a measured current I through at least one of the battery groups, and compare the received current value I to a reference current $I_R$ to obtain a current comparison result. The control module 106 then is configured to turn ON or OFF at least one of the first switches K1, K2 . . . Kn in accordance with the current comparison result. Since ON or OFF of the first switches K1, K2 . . . Kn is performed to adjust the voltage difference between two battery groups, the second switches Kr1, Kr2 . . . Krn may be kept ON when the battery module 102 is in operation.

In operation, when the first switches K1, K2 . . . Kn are ON and the current value I in each battery group is less than the reference current $I_R$ and greater than or equal to zero, i.e., $0 \leq I < I_R$, each of the second switches Kr1, Kr2 . . . Krn are turned ON. The second switches Kr1, Kr2 . . . Krn are ON and the first switches K1, K2 . . . Kn are turned OFF. In one example embodiment, $I_R$ is less than 0.5 A and greater than or equal to zero, i.e., $0 \leq I_R < 0.5$ A. In various applications, the ON operations of the second switch Kr1, Kr2 . . . Krn, and the OFF operations of the first switch K1, K2 . . . Kn, may be performed alternatively or sequentially. When the current value I in each battery group meets condition $0 \leq I < I_R$, turning ON the second switches Kr1, Kr2 . . . Krn, and then turning OFF the first switches K1, K2 . . . Kn, may control the current value I in each battery group under the maximum current value $I_{max}$, further more the load in the switching unit may not consume the power, which may save energy. In one example embodiment, the current value I is 0 A.

Figure 2:
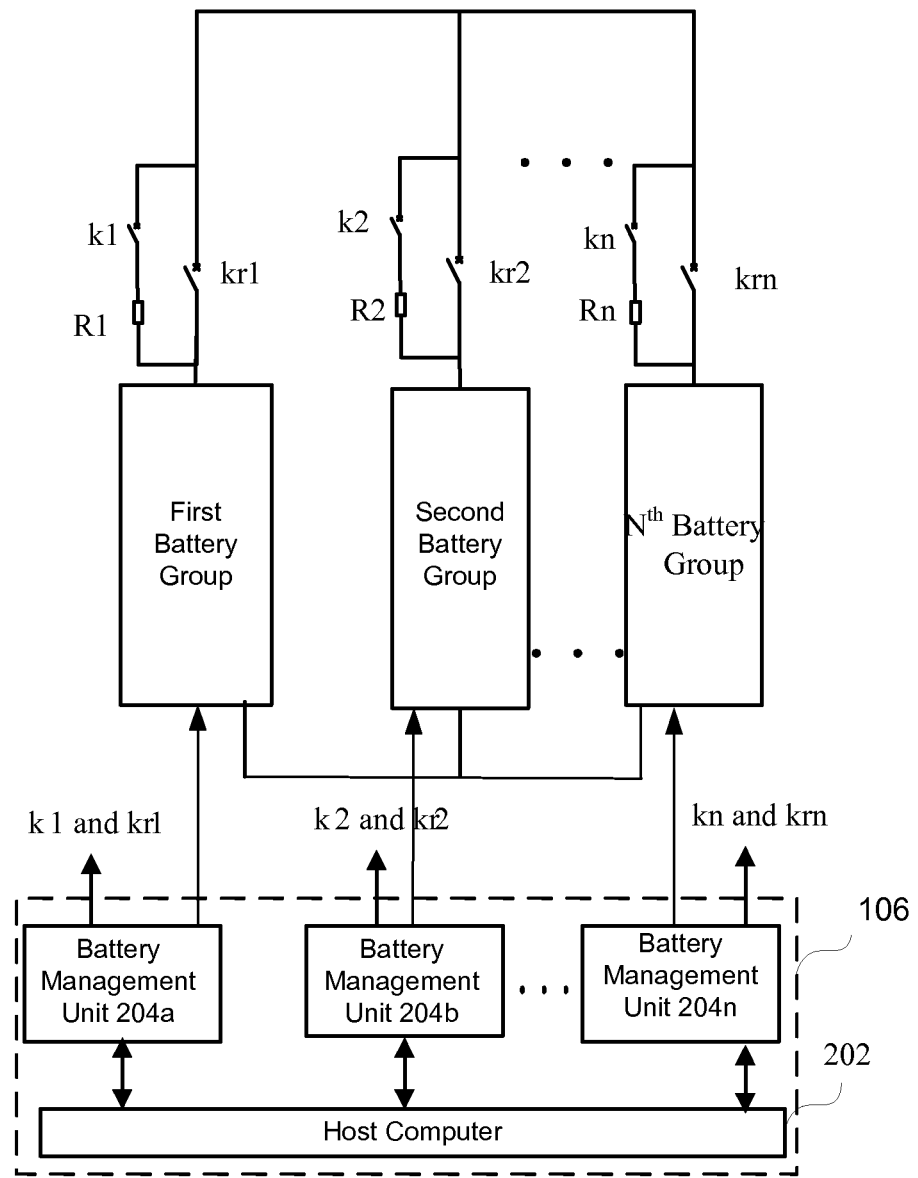
FIG. 2 illustrates a block diagram of a control module of a parallel device according to one exemplary embodiment of the present invention.

FIG. 2 illustrates a block diagram of an example control module 106 of a parallel device according to one exemplary embodiment of the present invention. As shown in FIG. 2, the control module 106 may include a host computer 202, and a plurality of battery management units 204a, 204b . . . 204n each of which is couplable to a respective battery group. In one example, the battery management unit 204a is couplable to the first battery group. The battery manage units 204 (204a, 204b . . . 204n) are configured to receive voltage values and current values from the battery groups, transmit the received voltage values and current values to the host computer 202, receive control signals from the host computer 202, and turn ON or OFF at least one of the first switches K1, K2 . . . Kn and the second switches Kr1, Kr2 . . . Krn in accordance with the control signals. The host computer 202 may be configured to calculate a voltage difference between the two received voltage values, compare the absolute value of the voltage difference to the reference voltage $U_R$, and compare the current value I flowing through the battery groups to the reference current $I_R$, and send the control signals to an associated battery management unit to turn ON or OFF at least one of the first switches K1, K2 . . . Kn and the second switches Kr1, Kr2 . . . Krn.

Figure 3:
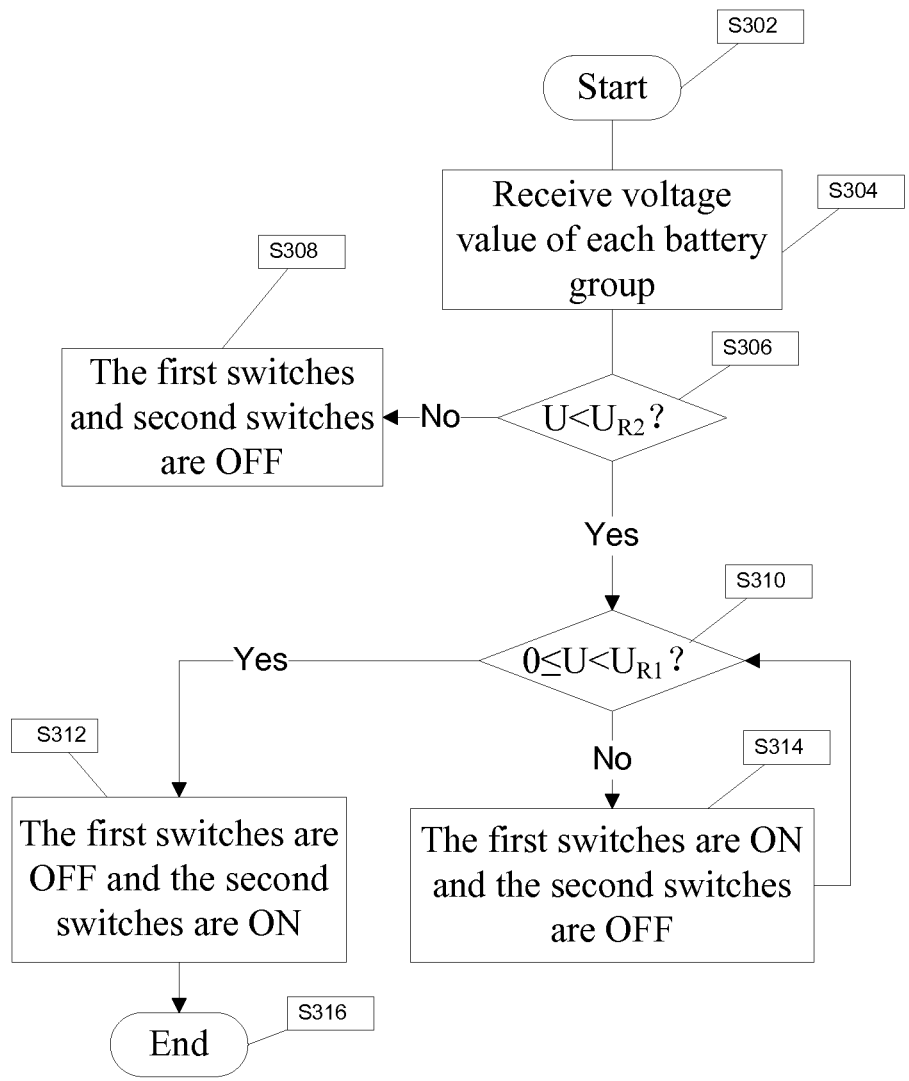
FIG. 3 illustrates a flow chart of a control method of a parallel device including a battery module according to one exemplary embodiment of the present invention.

FIG. 3 illustrates a flow chart of a method of controlling ON or OFF of the switching units 104 of the parallel device 100 according to one exemplary embodiment of the present invention. The operation starts at step S302. As described above, the control module 106 (shown in FIGS. 1 and 2) is configured to receive a voltage value from at least two battery groups, calculate a voltage difference U between the two received voltage values at step S304. The control module 106 then compares the absolute value of the voltage difference U to a reference voltage $U_R$. The reference voltage $U_R$ includes a first reference voltage $U_{R1}$ and a second, greater reference voltage $U_{R2}$, both of which are greater than or equal to zero, i.e., $0 \leq U_{R1} < U_{R2}$. The voltage difference U is first compared to the second reference voltage $U_{R2}$ at step S306. In an instance in which the voltage difference U is no less than the second reference voltage $U_{R2}$, the first switches K1, K2 ... Kn and the second switches Kr1, Kr2 ... Krn are turned OFF at step S308. Otherwise, the voltage difference U is compared to the first reference voltage $U_{R1}$ at step S310. In an instance in which the voltage difference U between the two battery groups is less than the first reference voltage $U_{R1}$ and greater or equal to zero, the first switches K1, K2 ... Kn are turned OFF, and the second switches Kr1, Kr2 ... Krn are turned ON, at step S312. Otherwise, in an instance in which at least one voltage difference U between the at least two battery groups is no less than the first voltage reference $U_{R1}$, the first switches K1, K2 ... Kn are turned ON, and the second switches Kr1, Kr2 ... Krn are turned OFF, at step S314. Until the voltage difference U between the at least two battery groups is less than the first reference voltage $U_{R1}$ and greater or equal to zero, the first switches K1, K2 ... Kn are turned OFF, and the second switches Kr1, Kr2 ... Krn are turned ON, at step S312, and operation ends at step S316. In various applications, the ON operations of the second switches Kr1, Kr2 ... Krn and, the OFF operations of the first switches K1, K2 ... Kn, may be performed alternatively or sequentially.

Figure 4:
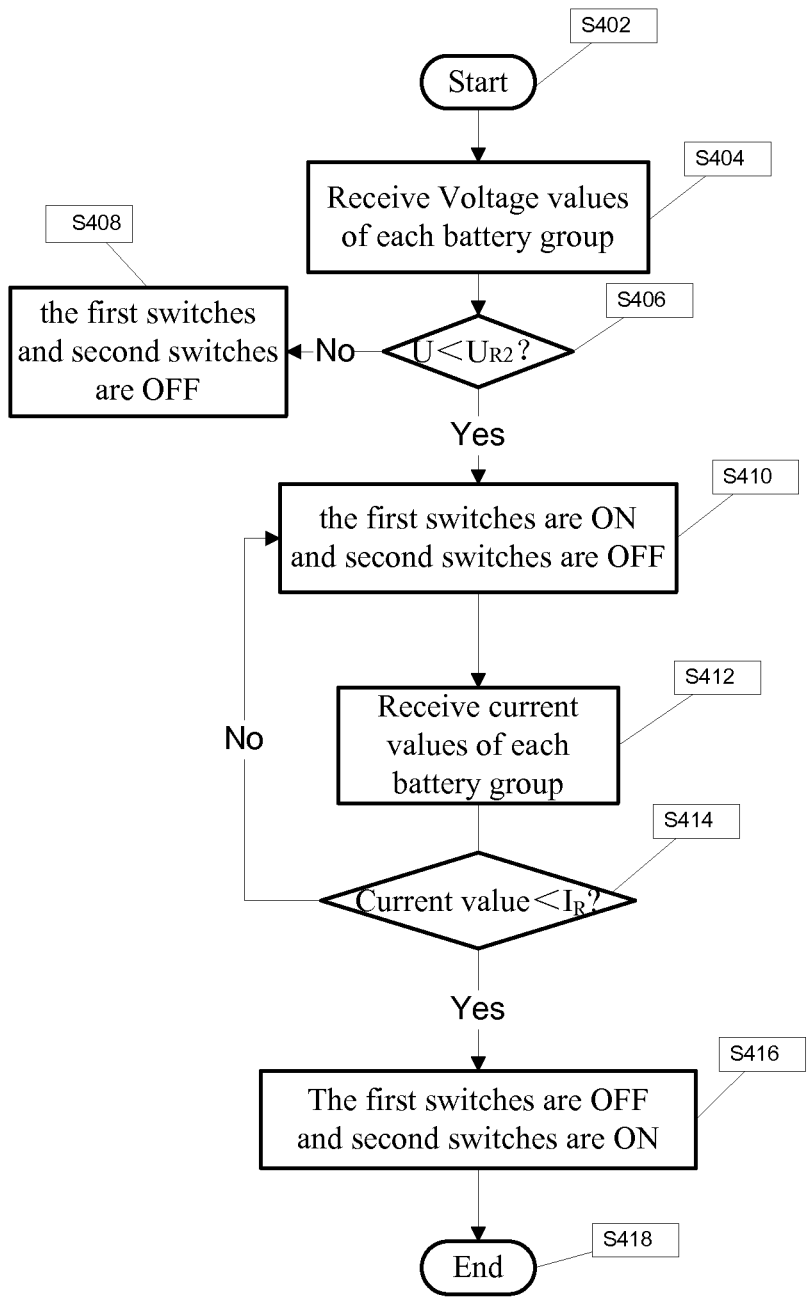
FIG. 4 illustrates a flow chart of control method of a parallel device including a battery module according to another exemplary embodiment of the present invention.

FIG. 4 illustrates a flow chart of a method of controlling ON or OFF of the switching units 104 of the parallel device 100 according to another exemplary embodiment of the present invention. The operation starts at step S402. Similar to the method described above in FIG. 3, the control module 106 is configured to receive voltage values from at least two battery groups, and calculate a voltage difference U between the two received voltage values, at step S404. The control module 106 then compares the absolute value of the voltage difference U to a reference voltage $U_R$. The reference voltage $U_R$ includes a first reference voltage $U_{R1}$ and a second, greater reference voltage $U_{R2}$, both of which are greater than or equal to zero, i.e., $0 \leq U_{R1} < U_{R2}$. The voltage difference U is first compared to the second reference voltage $U_{R2}$ at step S406. In an instance in which the voltage difference U is no less than the second reference voltage $U_{R2}$, the first switches K1, K2 ... Kn and the second switches Kr1, Kr2 ... Krn are turned OFF at step S408. Otherwise, the first switches K1, K2 ... Kn are turned ON, and the second switches Kr1, Kr2 ... Krn are turned OFF, at step S410. The control module 106 is then configured to receive a current value I from at least one of the battery groups at step S412, and compare the received current value I to a reference current $I_R$ to obtain a current comparison result. In an instance in which the received current value I is no less than the reference current $I_R$ compared at step S414, the method proceeds back to step S410. Otherwise, the first switches K1, K2 ... Kn are turned OFF, and the second switches Kr1, Kr2 ... Krn are turned ON, in accordance with the current comparison result at step S416. In various applications, the ON operations of the second switches Kr1, Kr2 ... Krn and the OFF operations of the first switches K1, K2 ... Kn may be performed alternatively or sequentially. The method then ends at step S418 with the current values less than the reference current $I_R$, and the voltage values less than the second reference voltage $U_{R2}$.

It will be appreciated by those skilled in the art that changes could be made to the examples described above without departing from the broad inventive concept. It is understood, therefore, that this invention is not limited to the particular examples disclosed, but it is intended to cover modifications within the spirit and scope of the present invention as defined by the appended claims.

What is claimed is:

1. A parallel device, comprising:
a battery module including a plurality of battery groups;
a plurality of switching units including a plurality of first switches, each of the switching units being couplable to a respective battery group in series, each series combination of the switching unit and the respective battery group being coupled in parallel with another series combination, and each of the switching unit including a respective first switch coupled with a load in series; and
a control module couplable to the battery module, wherein the control module is configured to receive values of measured voltages across at least two battery groups, calculate a voltage difference between the two received voltage values, compare an absolute value of the voltage difference to a reference voltage to obtain a voltage comparison result, and turn ON or OFF at least one of the first switches in accordance with the comparison result,
wherein the reference voltage includes a first voltage reference and a second voltage reference, and wherein the first voltage reference is about 0 V-0.5 V, and the second voltage reference is greater than the first reference and is less than or equal to multiplication of a resistance of the and a maximum current value flowing through the battery groups.

2. The parallel device of claim 1, wherein the plurality of switching units further includes a plurality of second switches, wherein each series combination of a first switch and a load is coupled in parallel with a respective second switch.

3. The parallel device of claim 2, wherein the control module comprises a plurality of battery management units and a host computer,
wherein each of the battery management units is couplable to a respective battery group and configured to receive the voltage values from the respective battery group, transmit the received voltage values to the host computer, receive control signals from the host computer, and turn ON or OFF at least one of the first switches and the second switches in accordance with the control signals, and
wherein the host computer is configured to receive the voltage values transmitted by the battery management units, calculate the voltage difference between the received voltage values, compare the absolute value of the voltage difference to the reference voltage value to obtain the voltage comparison result, and send the control signals to the associated battery management unit in accordance with the voltage comparison result.

4. The parallel device of claim 2, wherein the control module is further configured to receive a value of a measured current through at least one of the plurality of battery groups, compare the received current value to a reference current value to obtain a current comparison result, and turn ON or OFF at least one of the first switches in accordance with the current comparison result.

5. The parallel device of claim 4, wherein the current reference value is about 0 A-0.5 A.

6. The parallel device of claim 2, wherein the control module comprises a plurality of battery management units and a host computer,
wherein each of the battery management unit is couplable to a respective battery group and configured to receive a value of a measured current flowing through the respective battery group, transmit the received current value to the host computer, receive control signals from the host computer and turn ON or OFF at least one of the first switches and at least one of the second switches in accordance with the control signals, wherein the host computer is configured to receive the current value transmitted by the battery management unit, compare the received current value to a reference current value to obtain a current comparison result, and send the control signals to the associated battery management unit in accordance with the current comparison result.

7. A method of controlling a parallel device, the parallel device including a plurality of battery groups, a plurality of switching units and a control module being couplable to the plurality of battery groups, wherein each of the switching units includes a first switch and a second switch, each series combination of the first switch and a load coupled in parallel with a respective second switch, each series combination of the switching unit and a respective battery group coupled in parallel with another series combination, the method comprising:

receiving values of measured voltages across at least two battery groups;

calculating a voltage difference between the two received voltage values;

comparing an absolute value of the voltage difference to a reference voltage to obtain a voltage comparison result; and turning ON or OFF at least one of the first switches in accordance with the voltage comparison result;

turning ON or OFF at least one of second switches in accordance with the voltage comparison result in an instance in which the first switch is OFF and the second switch is ON.

8. The control method of claim 7 further comprising:

receiving a value of a measured current through at least one of the plurality of battery groups;

comparing the received current value to a reference current to obtain a current comparison result; and turning ON or OFF at least one of the first switches in accordance with the current comparison result.

9. The method of claim 8 further comprising:

turning ON or OFF at least one of the second switches in accordance with the current comparison result in an instance in which the first switch is OFF and the second switch is ON.

10. The method of claim 8 further comprising:

turning ON at least one of the second switches and turning OFF at least one of the first switches in an instance in which all the received current values are less than the current reference.

11. The method of claim 8 further comprising:

turning ON at least one of the first switches and turning OFF at least one of the second switches in an instance in which at least one of the received current values is no less than the current reference.

12. The method of claim 7, the reference voltage including a first voltage reference and a second voltage reference, wherein the first voltage reference is no less than zero and less than the second voltage reference, the method comprising:

turning OFF at least one of the first switches and at least one of the second switches in an instance in which at least one of the voltage differences is no less than the second voltage reference.

13. The method of claim 7, the reference voltage including a first voltage reference and a second voltage reference, wherein the first voltage reference is no less than zero and less than the second voltage reference, the method comprising:

turning ON at least one of the first switches and OFF at least one of the second switches in an instance in which all the voltage differences are less than the second voltage reference and at least one of the voltage differences is less than the first voltage reference.

14. The method of claim 7, the reference voltage including a first voltage reference and a second voltage reference, wherein the first voltage reference is no less than zero and less than the second voltage reference, the method comprising:

turning OFF at least one the first switches and turning ON at least one of the second switches in an instance in which all the voltage differences are less than the first voltage reference.

15. A control module being couplable to a battery module including a plurality of battery groups, each of the battery groups being couplable to a respective first switch, a second switch and a load, wherein the control module is configured to receive values of measured voltages across at least two battery groups;

calculate a voltage difference between the two received voltage values;

compare an absolute value of the voltage difference to a reference voltage to obtain a voltage comparison result; and turn ON or OFF at least one of the first switches in accordance with the comparison result;

receive a value of a measured current through one of the plurality of battery groups, compare the received current value to a reference current to obtain a current comparison result;

turn ON or OFF at least one of the first switches in accordance with the current comparison result; and turn ON or OFF at least one of the second switches in accordance with the voltage comparison result or the current comparison result in an instance in which the first switch is OFF and the second switch is ON.

16. The control module of claim 15, comprising a plurality of battery management units and a host computer, wherein each of the battery management unit being couplable to a respective battery group is configured to receive the values of measured voltages across the respective battery groups, transmit the received voltage values to the host computer, receive a control signal from the host computer and turn ON or OFF at least one of the first switches and the second switches in accordance with the control signal, and the host computer is configured to receive the voltage values transmitted by the battery management units, calculate voltage difference between the received voltage values, compare the absolute value of voltage difference to the reference voltage value to obtain the voltage comparison result, and send control signals to associated battery management unit to turn ON or OFF at least one of the first switches and the second switches in accordance with the voltage comparison result.

* * * * *

UNITED STATES PATENT AND TRADEMARK OFFICE
CERTIFICATE OF CORRECTION

PATENT NO. : 8,704,405 B2
APPLICATION NO. : 13/072587
DATED : April 22, 2014
INVENTOR(S) : Linwang Deng et al.

Page 1 of 1

It is certified that error appears in the above-identified patent and that said Letters Patent is hereby corrected as shown below:

<u>Title Page,</u>

"(30) Foreign Application Priority Data

Mar. 29, 2010 (CN)...................................... 2010 1 0139260"

should read

--(30) Foreign Application Priority Data

Mar. 29, 2010 (CN)...................................... 201010139260.9--

Signed and Sealed this
Fourth Day of November, 2014

Michelle K. Lee
*Deputy Director of the United States Patent and Trademark Office*